Feb. 14, 1950    E. W. DAVIS    2,497,762
LUBRICATION GUN
Filed Oct. 4, 1945    2 Sheets-Sheet 1
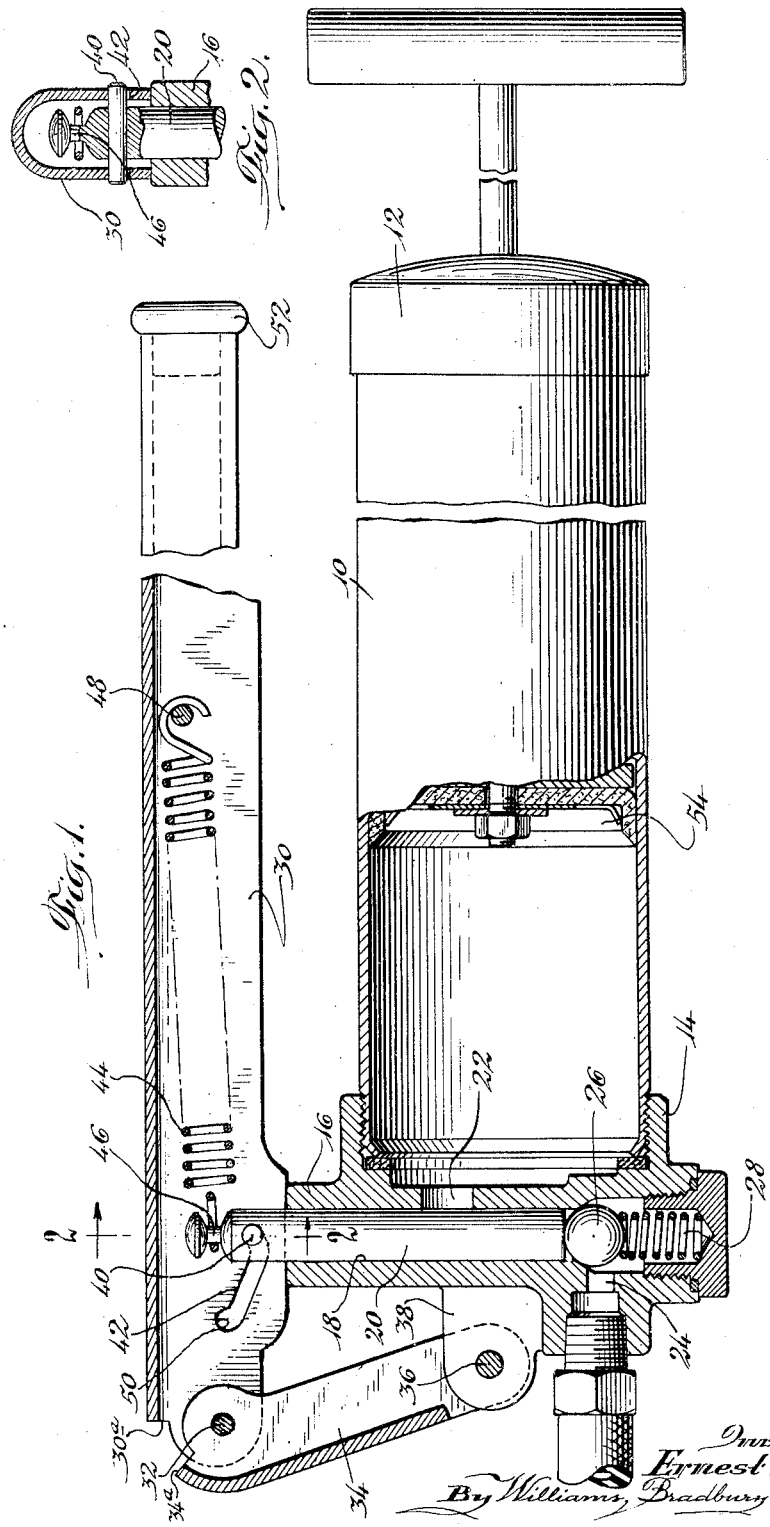
Inventor:
Ernest W. Davis
By Williams, Bradbury & Hinkle
Attorneys.

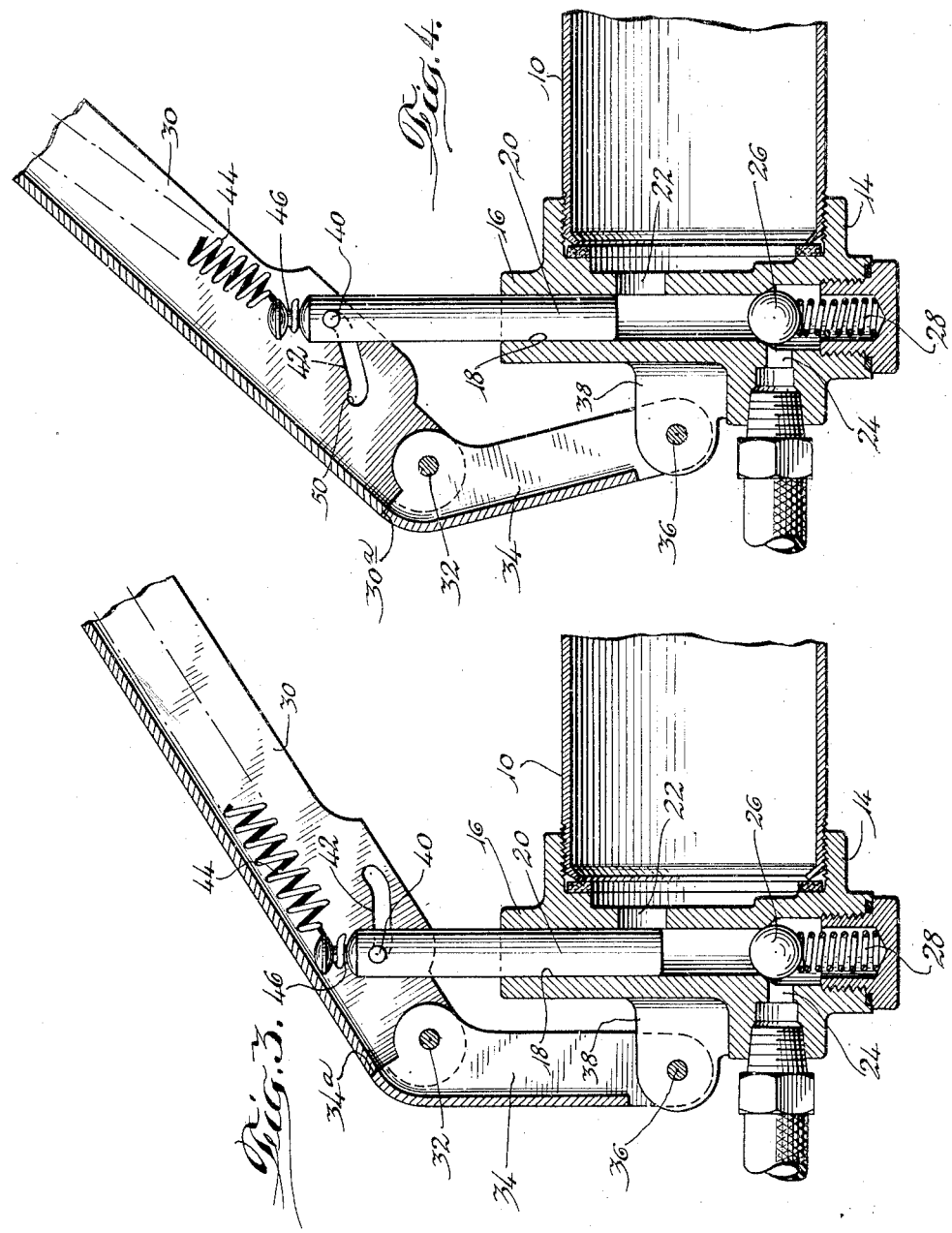

Patented Feb. 14, 1950

2,497,762

UNITED STATES PATENT OFFICE 2,497,762

LUBRICATION GUN

Ernest W. Davis, River Forest, Ill.

Application October 4, 1945, Serial No. 620,340

7 Claims. (Cl. 103—38)

This invention relates generally to lubricant compressors, and more particularly to hand operated grease guns of the lever type. It is an object of the invention to provide an improved grease gun having a lever mechanism normally arranged to operate the gun at high volume but adjustable at will to supply increased pressure when needed.

More specifically, the invention is designed to provide an improved grease gun of the lever type in which the lever is coupled to the grease expelling plunger of the gun in a manner for normally developing high volume but in which the connection between the lever and the plunger is adjustable for shifting the connection nearer to the lever fulcrum so as to temporarily increase the pressure available.

Other objects and advantages will appear from the following description, reference being had to the accompanying drawings, in which:

Fig. 1 is a side elevation of a grease gun embodying this invention with parts shown in section and with parts broken away to condense the view;

Fig. 2 is a detail sectional view taken as indicated at line 2—2 on Fig. 1;

Fig. 3 is a side elevation with parts broken away and parts shown in section illustrating the adjustment of the mechanism for developing extra high pressure;

Fig. 4 is a view similar to Fig. 3, showing the operating lever at the outer limit of its stroke.

The grease gun shown in the drawings as illustrative of the invention includes the usual barrel or reservoir 10 which is closed at one end by a cap 12 and threaded at the opposite end to fit into a threaded flange 14 on a cast head 16 which contains the cylinder 18 and the plunger 20 reciprocable therein. The barrel 10 which provides the supply of grease communicates with the cylinder 18 through a port 22 which is covered and uncovered by movement of the plunger 20 so that as the plunger is withdrawn in its return stroke, the grease enters the cylinder 18 from the barrel 10 and then is expelled from cylinder 18 by the feed stroke of the plunger 20. The outlet port 24 through which the grease is fed from the cylinder 18 is controlled by a check valve 26 seated by a spring 28 in the conventional manner.

The operating lever 30 is fulcrumed at 32 on a pivot carried in one end of the link 34, the opposite end of the link being pivoted at 36 to a lug 38 extending rigidly from the head 16. As indicated in Fig. 2, the lever 30 may be of U- shape or channel cross section at least at the end which engages the plunger 18 so that the outer end of said plunger extends into the channel of the lever 30 and is connected thereto by means of a cross pin 40 fixed in the end portion of the plunger and engaging both legs of the channel form 30. Instead of ordinary pivot holes to receive the pin 40, each leg of the channel is formed with a slot 42 extending longitudinally of the lever 30 and normally the pin 40 is engaged in these slots at the ends thereof remote from the fulcrum pivot 32. This provides for a maximum operating stroke of the plunger 20 and this relation of the parts is normally maintained by a tension spring 44 having one end hooked around the reduced terminal 46 of the plunger 20 and having its opposite end hooked over a cross pin 48 fixed in the lever 30.

In operating the grease gun the lever 30 is swung toward and from the barrel 10 about its fulcrum 32. When in any instance the operator finds it particularly difficult to operate the lever through its feeding stroke, as when a bearing or a passage leading thereto is clogged or plugged with dry grease and dirt, then by pulling lengthwise on the lever he can overcome the tension of the spring 44 so as to slide the pin 40 along the slots 42 for engagement in the opposite end portions 50 of said slots as shown in Fig. 3. The distance between these ends of the slots 50 and the fulcrum pin 32 is shown as about half the distance between the fulcrum 32 and the remote ends of the slots 42 so that upon thus shifting the lever with respect to the plunger pin 40, the operator will substantially double the leverage which he can apply to the plunger 20 and will be able to temporarily provide high pressure for overcoming the obstruction and feeding grease to the bearing. The outer end of lever 30 is formed with a knob 52 to prevent the operator's hand from slipping off the lever if it should be greasy. As soon as the need for extra high pressure is passed, the operator will merely permit the spring 44 to return the parts to their original positions as shown in Fig. 1, in which the lever is coupled to the plunger at a convenient distance for operating it through a long feeding stroke so as to develop high volume but at a moderate pressure.

The reservoir 10 may be of any conventional construction and may be provided with a follower piston 54 for exerting pressure upon the supply of grease and moving it toward and through the port 22 as it is required.

Preferably, the slots 42 in the lever 30 are inclined at about 10° to the center line or axis of the lever, so that as shown in Fig. 1, in the normal position of the lever the slots extend from the pivot 40 at a slightly obtuse angle to the axis of the plunger 20. Then if the lever is shifted to engage the pin 40 in the end portions 50 of the slots 42, said slots are inclined to the axis of the plunger at a slightly acute angle when the plunger stands at its lower limit of movement; and throughout the high pressure range of movement of the lever 30, the direction of the slots 42 with relation to the plunger axis will be such that the pressure will not tend to shift the pin 40 away from the terminal portions of the slots at 50. The lever 30 will be easily held against the tension of the spring 44 in the high pressure position and will be readily returned to the low pressure position by the tension of the spring.

When the pin 40 engages the end portions 50 of the slots 42 for the high pressure working stroke, the return or filling stroke of the plunger 20 will require a considerable movement of the lever 30 away from the reservoir or cylinder 10 because of the reduced leverage afforded by this adjustment. When the lever 30 has been raised to the position shown in full lines in Fig. 3, the abutment 39a which is disposed in radial relation to the fulcrum pin 32 engages the abutment 34a which also is radially disposed with respect to the fulcrum pin 32. As seen in Fig. 3, this occurs before the plunger has fully uncovered the port 22. At this position of the lever the angle of the slots 42 with respect to the axis of the plunger 20 is such that further outward movement of the lever 30 causes the pin 40 to be shifted along the slots from the end portions 50 thereof toward the opposite end. In such further outward movement of the lever 30, said lever and the link 34 move as a unit about the pivot 36 as a fulcrum and the underside of each of the slots 42 serves as a cam operating against the pin 40 to lift the plunger 20 to the upper limit of its stroke, as illustrated in Fig. 4. The lever 30 is thus automatically returned to its initial position, but if an additional high pressure stroke is required, the lever will be swung downwardly through a partial stroke and then shifted longitudinally to bring the pin 40 into the end portions 50 of the slots 42.

While I have shown and described a preferred embodiment of my invention, it will be apparent that numerous changes and modifications thereof may be made without departing from the underlying principles of the invention, and I therefore intend the following claims to include and cover all such variations and modifications by which substantially the results of the invention may be obtained through the use of substantially the same or equivalent means.

I claim:

1. In a lever type grease gun which includes a head with a cylinder therein, a plunger reciprocable in the cylinder, and a lever fulcrumed on the head, said lever having a longitudinal slot inclined approximately 10° to the longitudinal axis of said lever, a pivot carried by the plunger and engageable selectively at different positions in the length of said slot to vary the leverage applied to operate the plunger.

2. In a lever type grease gun which includes a head with a cylinder therein, a plunger reciprocable in the cylinder, and a lever fulcrumed on the head, said lever having a longitudinal slot, a pivot carried by the plunger and engageable selectively at different positions in the length of said slot to vary the leverage applied to operate the plunger, together with spring means normally urging the lever in a direction to bring the end of the slot remote from the fulcrum of the lever into engagement with said pivot.

3. In a lever type grease gun which includes a head with a cylinder therein, a plunger reciprocable in the cylinder and projecting therefrom, a lever extending transversely of the plunger, and fulcrum means for the lever movable on said head toward and from the axis of the plunger, a longitudinal slot in said lever inclined obtusely to the longitudinal axis of said lever, a pivotal connection between the lever and said projecting part of the plunger adjustable in said slot to vary the distance from the lever fulcrum to said pivotal connection.

4. In a lever type grease gun which includes a head with a cylinder therein, a plunger reciprocable in the cylinder, a link pivoted to the head and a lever fulcrumed on said link, a pivotal connection between the lever and the plunger adjustable longitudinally of the lever upon shifting the lever as permitted by the swing of the link upon which it is fulcrumed.

5. In a lever type grease gun as defined in claim 4, yielding means urging said lever in a direction to shift said pivotal connection toward one limit of its range of adjustment.

6. In a lever type grease gun which includes a head with a cylinder therein, a plunger reciprocable in the cylinder, a link pivoted to the head and a lever fulcrumed on said link, said plunger having one end portion projecting from the cylinder, said lever having the form of channel into which the plunger projects, the adjacent walls of the channel having longitudinally extending slots, a pivot in the end portion of the plunger and engaged in said slots, said link permitting the lever to be shifted longitudinally at will for changing the position of said pivot in the slots and thereby altering the leverage applied to the plunger.

7. In a grease gun as defined in claim 6, a spring extending in said channel with one end anchored therein and with its opposite end attached to the plunger to hold said lever yieldingly with the pivot at the ends of said slots remote from the fulcrum of the lever.

ERNEST W. DAVIS.

REFERENCES CITED

The following references are of record in the file of this patent:

UNITED STATES PATENTS

| Number | Name | Date |
| --- | --- | --- |
| 532,265 | Cornell | Jan. 8, 1895 |
| 1,234,587 | Weatherly | July 24, 1917 |
| 2,044,044 | Anthony | June 16, 1936 |